Patented July 9, 1935

2,007,754

UNITED STATES PATENT OFFICE 2,007,754

PRODUCTION OF HYDROCARBONS

Paul Feiler and Hans Haeuber, Ludwigshafen-on-the-Rhine, Germany, assignors to I. G. Farbenindustrie Aktiengesellschaft, Frankfort-on-the-Main, Germany No Drawing. Application January 5, 1931, Serial No. 506,739. In Germany January 13, 1930

8 Claims. (Cl. 196—10)

The present invention relates to the production of hydrocarbons, in particular to the conversion of gaseous or vaporized hydrocarbons into hydrocarbons having lower content in hydrogen.

It has already been proposed to convert gaseous or vaporous hydrocarbons, which are hereinafter referred to collectively as vaporized hydrocarbons, into hydrocarbons having a lower content in hydrogen by treating them with catalysts at elevated temperatures at atmospheric or increased pressures, for example to convert saturated aliphatic hydrocarbons into unsaturated aliphatic or aromatic hydrocarbons. The reactions which lead from olefines to valuable hydrocarbons of low boiling point, especially benzene, and the reactions which lead from hydrocarbons of the methane series to olefines and hydrocarbons of low boiling point, especially aromatic hydrocarbons, are particularly important.

For the said reactions, the elements of the 4th group of the periodic system such as silicon, tin and carbon have been proposed as catalysts having a very good action, the latter yielding especially good results when used in the form of lustrous carbon.

We have now found that the residues which are formed in the dry distillation of natural coals, are very advantageous as catalysts for the said reactions. Of these residues, high temperature coke acts especially favorably and moreover it combines the advantages of its being available in large amounts and of its large active surface on account of its porosity. Coke retains its porous structure even after use for several days.

It is preferable to work at temperatures above 400° C. but below temperatures at which any substantial splitting of hydrocarbons under treatment into hydrogen and carbon takes place. The temperature at which the hydrocarbons are split up into carbon and hydrogen depends on the nature of the single hydrocarbons and also on the nature of the catalyst and on the velocity of flow employed. The said residues may be employed as catalysts either in externally heated tubes in continuous operation, or, preferably, by reason of their heat-exchanging properties, in discontinuous operation. In the latter case the heating may be effected by means of combustion gases, as for example in Cowper apparatus, or, since the catalyst is comparatively cheap, by burning a part thereof with gases containing oxygen, as for example in gas producer apparatus. The temperature in this case should be below 1100° C.

If necessary the catalyst may be partly or wholly freed from mineral constituents, especially from iron, before its employment by boiling up with acids.

The process according to the present invention may be carried out at ordinary or elevated pressures. Pressures up to 300 atmospheres and more may be employed, but it is preferable to work at pressures up to 200 atmospheres. The temperature to be used depends on the nature of the hydrocarbons, on the concentration thereof, on the pressure and on the velocity of flow of the materials treated. In order to convert methane into aromatic hydrocarbons at ordinary pressure it is preferable to work at temperatures ranging between 950° and 1300° C.; when effecting the conversion of ethane, propane or butane or mixtures thereof at ordinary pressure into olefines temperatures ranging from 500° to 850° C. are suitable; when converting into aromatic hydrocarbons saturated gaseous hydrocarbons, such as ethane or propane or butane, or olefines, such as ethylene or propylene or butylene temperatures between 600° and 900° C. should be employed at ordinary pressure, while at elevated pressures of between about 50 and 200 atmospheres temperatures ranging from about 400° to 650° C. are preferable.

The following examples will further illustrate the nature of this invention, but the invention is not restricted to these examples. The parts are by weight.

Example 1

10 liters of a gas having the following composition: 8.2 per cent of $C_4H_8$, 49.4 per cent of $C_4H_{10}$, 4.2 per cent of $C_3H_6$, 31.2 per cent of $C_3H_8$ and 7.0 per cent of $C_2H_6$, are passed per hour at ordinary pressure through a porcelain tube filled with pieces of mineral coke of the size of peas and heated externally to 800° C. (heated length 60 centimeters, internal diameter 18 millimeters). Twice the volume of a gas of the following composition: 26.5 per cent of hydrogen, 45.8 per cent of $CH_4$, 2.1 per cent of $N_2$, 0.4 per cent of $C_4H_8$, 0.6 per cent of $C_3H_6$, 23.4 per cent of $C_2H_4$ and 1.2 per cent of $C_2H_6$ is obtained and also 410 grams per cubic meter of the initial gas of a liquid condensate which contains about 50 per cent of constituents boiling up to 100° C.

The coke has the same porosity and action after use for 80 hours as it had at the commencement.

Example 2

3000 liters of a gas containing 17.9 per cent of olefines, mainly $C_2H_4$, 19.2 per cent of CO, 22.4 per cent of $H_2$, 2.4 per cent of $C_2H_4$, 25.4 per cent of $CH_4$ and 12.7 per cent of $N_2$, are passed per hour under a pressure of 50 atmospheres through a tube of V2A-steel lined with sheet aluminium of an internal diameter of 90 millimeters filled with pieces of gas coke of the size of hazel nuts which have been purified by boiling up with hydrochloric acid and subsequently washing, and which is heated to a temperature of from 480° to 500° C. for a length of 50 centimeters by means of superheated steam.

6.3 per cent by volume of the olefines are converted by a single passage through the tube. From these converted olefines, 80 per cent by weight are obtained as a liquid mixture of unsaturated and saturated aliphatic and aromatic hydrocarbons by cooling, of which 73.2 per cent boil between 40° and 120° C., 23 per cent by weight between 120° and 200° C. and the remainder above 200° C.

The effluent gases may be led again through the same tube or through a second tube for further conversion. The temperature, velocity of flow and pressure depend on the desired final product. When the temperature is raised, a product of higher boiling point as well as more methane in the final gas are obtained.

Even after operation for several days, the catalyst employed is almost entirely free from deposited carbon.

Example 3

12 cubic meters of a gas containing 19.5 per cent of olefines, obtained by heating bituminous coals rapidly for a very short time to dark or bright red heat and then rapidly cooling both the resulting gas and the coke, are passed hourly at ordinary pressure through a reaction vessel having a height of 3.75 meters and a transverse area of 5 square meters, which is maintained at a temperature of 850° C. and which is filled with 120 kilograms of high temperature coke. A reaction gas is obtained which contains besides 8.8 per cent of unchanged gaseous olefines 90 cubic centimeters of liquid hydrocarbons per cubic meter of the initial gas. The said liquid hydrocarbons consist to the extent of about 80 per cent of benzene.

What we claim is:—

1. In the conversion by heat treatment of a normally gaseous hydrocarbon into hydrocarbons having a lower ratio of hydrogen to carbon, the step which comprises effecting said conversion at a temperature between 400° and 1300° C. in the presence of a coke formed in the dry distillation of a natural coal.

2. In the conversion of a gaseous homologue of methane into olefines by heat treatment, the step which comprises effecting said conversion at a temperature between 500° and 850° C. in the presence of high temperature coke.

3. In the conversion of a gaseous olefine into low boiling hydrocarbons of the benzene series by heat treatment, the step which comprises effecting said conversion at a temperature between 600° and 900° C. in the presence of high temperature coke.

4. In the conversion by heat treatment of a mixture of normally gaseous hydrocarbons into hydrocarbons having a lower ratio of hydrogen to carbon the step which comprises effecting said conversion at a pressure of up to 300 atmospheres at a temperature between 400° and 1300° C. and in the presence of a coke formed in the dry distillation of a natural coal.

5. In the conversion by heat treatment of normally gaseous hydrocarbons into hydrocarbons having a lower ratio of hydrogen to carbon, the step which comprises effecting said conversion at a temperature between 400° C. and 1300° C. in the presence of a coke formed in the dry distillation of a natural coal, the coke being periodically heated to the reaction temperature.

6. The process of converting gaseous hydrocarbons of the methane series into olefines with a high temperature coke as a catalyst, which comprises preliminarily heating the coke to a temperature of 500 to 850° C., discontinuing the heating, contacting the coke with said gaseous hydrocarbons to convert them into olefines and periodically reheating the coke to the reaction temperature and contacting the gaseous hydrocarbons with the heated coke.

7. The process as defined in claim 5 wherein the reaction is effected at a temperature of between 400 and 1100° C. in a gas producer and the coke is periodically heated by burning a portion thereof with oxygen.

8. The process as defined in claim 6 wherein the reaction is effected in a gas producer and the coke is periodically heated by burning a portion thereof with oxygen.

PAUL FEILER.
HANS HAEUBER.